United States Patent [19]

Sato

[11] Patent Number: 5,790,318

[45] Date of Patent: Aug. 4, 1998

[54] TWO-GROUP ZOOM LENS

[75] Inventor: Kenichi Sato, Omiya, Japan

[73] Assignee: Fuji Photo Optical Co., Ltd., Omiya, Japan

[21] Appl. No.: 702,030

[22] Filed: Aug. 23, 1996

[30] Foreign Application Priority Data

Oct. 5, 1995 [JP] Japan ................................. 7-284551

[51] Int. Cl.[6] ..................................................... G02B 15/14
[52] U.S. Cl. ........................... 359/692; 359/714; 359/717
[58] Field of Search ................................. 359/692, 690, 359/688, 687, 676, 795, 713–717

[56] References Cited

U.S. PATENT DOCUMENTS

| 5,071,235 | 12/1991 | Mori et al. ................... | 359/692 |
| 5,162,947 | 11/1992 | Ito ................................ | 359/692 |
| 5,541,773 | 7/1996 | Kamo et al. ................. | 359/692 |
| 5,610,767 | 3/1997 | Ito ................................ | 359/692 |
| 5,663,838 | 9/1997 | Hasushita et al. .......... | 359/689 |
| 5,666,233 | 9/1997 | Ogata ........................... | 359/692 |

FOREIGN PATENT DOCUMENTS 6-18783  1/1994  Japan.
6-281860 7/1994  Japan.

*Primary Examiner*—Georgia Y. Epps
*Assistant Examiner*—Jordan M. Schwartz
*Attorney, Agent, or Firm*—Ronald R. Snider

[57] ABSTRACT

Even when the refractive index of the plastic material forming a plastic lens fluctuates due to temperature change and the like, the change in the paraxial back focus amount caused by this fluctuation is canceled by spherical aberration which is generated by an aspheric surface and yields an action in a direction opposite thereto, whereby the fluctuation in refractive index in the plastic lens due to temperature change and the like is suppressed while a demand for attaining a compact size with high performances is satisfied. The second lens ($L_2$) in the first lens group ($G_1$) and the fourth lens ($L_4$) in the second lens group ($G_2$) are formed by plastic lenses, while each of the both sides of these plastic lenses is made as an aspheric surface, whereby, even when the refractive index of the plastic material fluctuates due to temperature change and the like, the change in paraxial back focus amount caused by this fluctuation is canceled by the spherical aberration which is generated by this aspheric surface and yields an action in a direction opposite thereto, so as to suppress the fluctuation in imaging position.

1 Claim, 5 Drawing Sheets

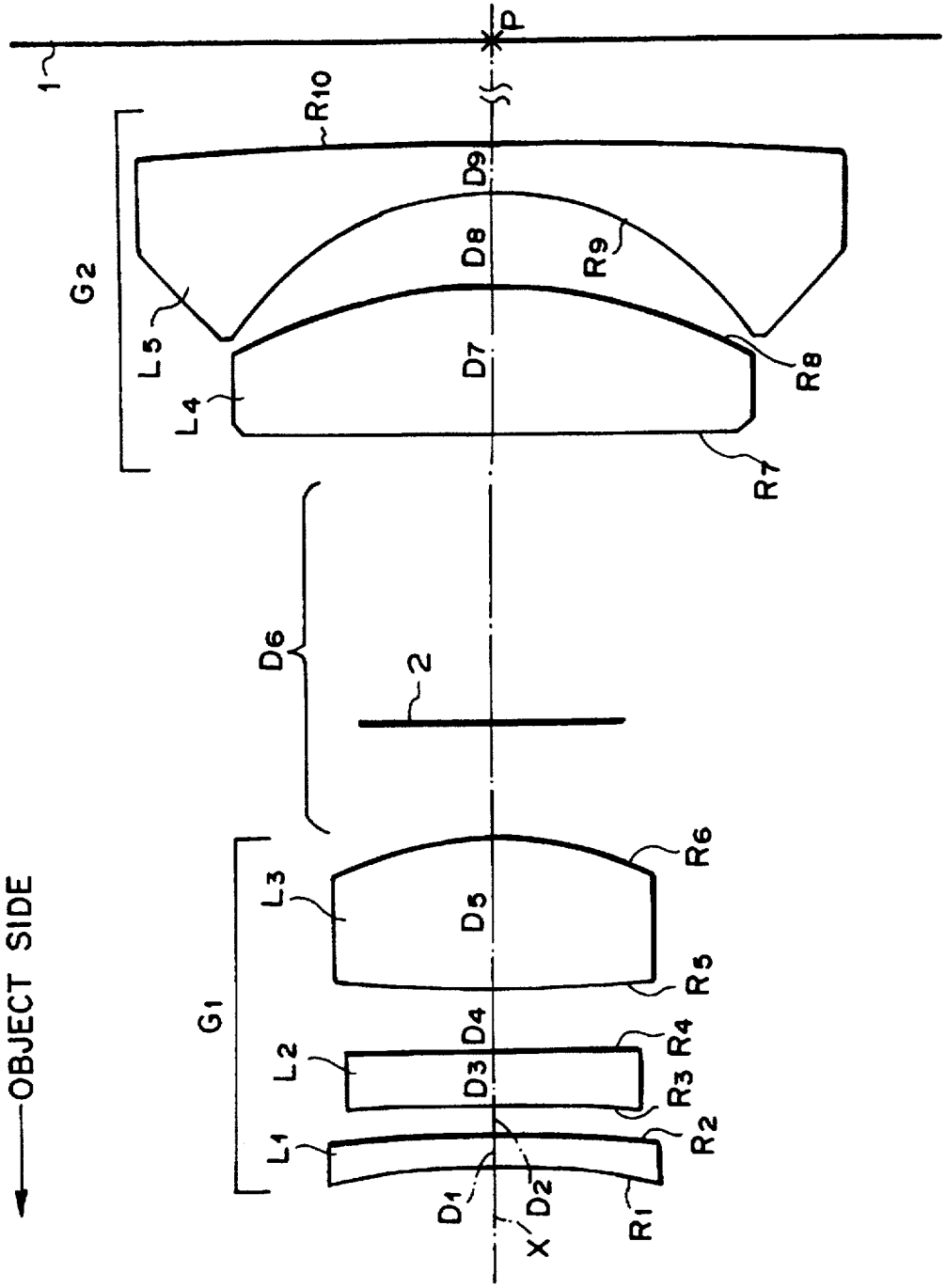

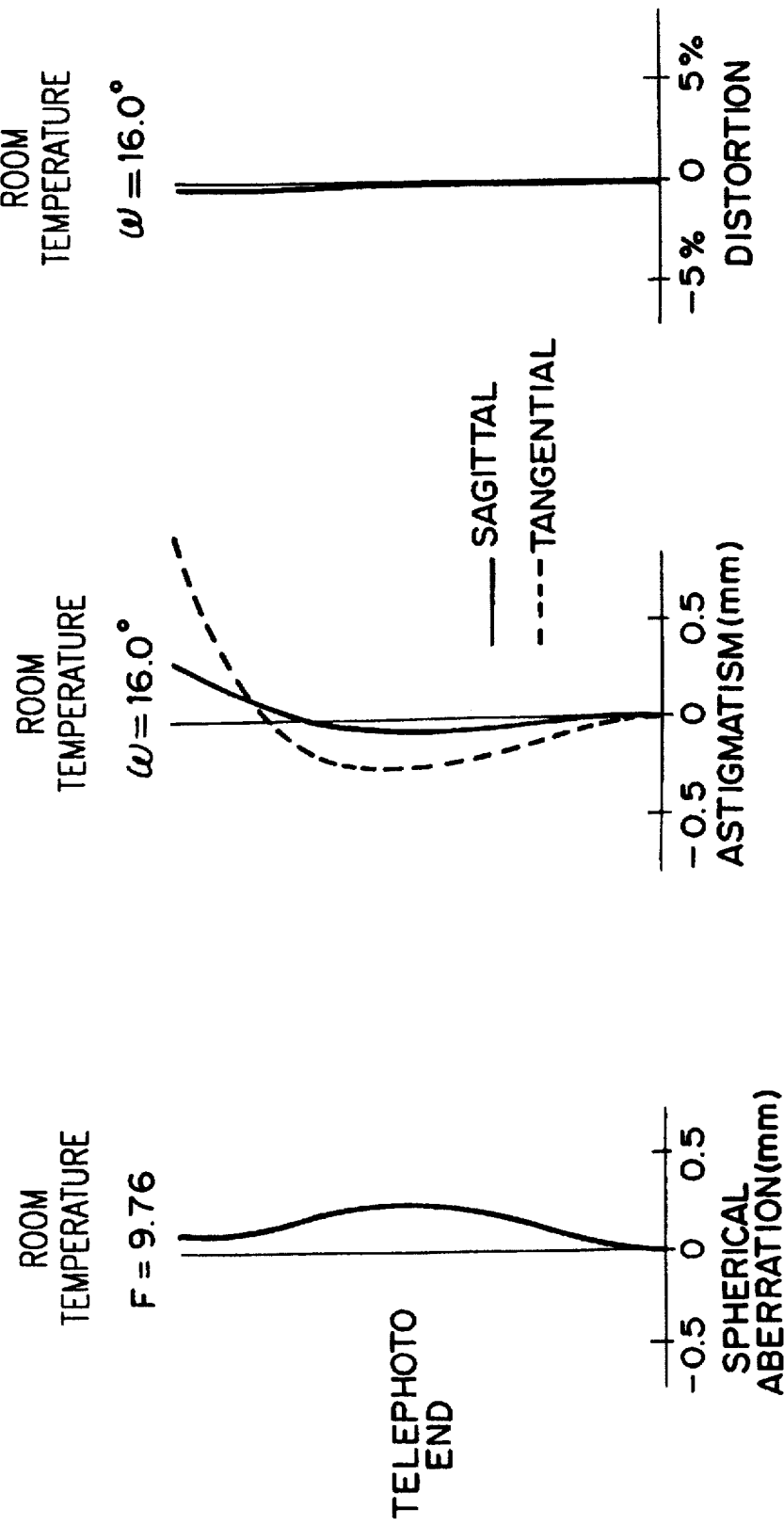

TWO-GROUP ZOOM LENS

RELATED APPLICATIONS

This application claims the priority of Japanese Patent Application No. 7-284551 filed on Oct. 5, 1995, which is incorporated herein by reference.

BACKGROUND OF THE INVENTION

1. Field of the Invention

The present invention relates to a compact zoom lens composed of two groups and, in particular, to a compact two-group zoom lens used in lens-shutter cameras and the like.

2. Description of the Prior Art

In lens systems used in lens-shutter cameras, a demand for reducing their cost and size has been increasing year by year.

In recent years, in response to such a demand, it has been contrived to use a plastically-molded aspherical lens in the lens system of the lens-shutter camera.

While a plastic lens can satisfy the demand for reducing the cost and size of the lens system, it may be problematic in that its refractive index fluctuates much due to environmental changes (referred to as "temperature change and the like" hereinafter).

As techniques for overcoming such a problem, there have been known a technique in which the power of this plastic lens is nullified and a technique in which a plurality of plastic lenses whose absolute power values are different from each other are used so as to cancel the total power thereof.

An example of the former technique in which the power of this plastic lens is nullified is disclosed in Japanese Unexamined Patent Publication No. 6-281860, whereas an example of the latter technique in which a plurality of plastic lenses are combined together so as to cancel their powers against each other is disclosed in Japanese Unexamined Patent Publication No. 6-18783.

In the conventional techniques such as those mentioned above for reducing the fluctuation in refractive index of the plastic aspherical lens caused by temperature change and the like, however, since the degree of freedom in its design inevitably lowers, a greater restriction is imposed on the designing of the lens. Accordingly, there may be cases where the lens contradicts the demand for attaining a compact size which is the aimed object for using a plastic lens and makes it difficult to attain the aimed object.

SUMMARY OF THE INVENTION

In view of such a circumstance, the object of the present invention is to provide a compact two-group zoom lens which can suppress the fluctuation in refractive index of a plastic lens caused by temperature change and the like, without lowering the degree of freedom in the lens design.

The present invention provides a compact two-group zoom lens comprising, successively from the object side, a positive first lens group and a negative second lens group, in which the distance between these two lens groups is changed so as to attain a variable power;

wherein at least one plastic lens having an aspheric surface is disposed in each of the two lens groups; and wherein the aspheric surface has a form for generating spherical aberration which compensates for fluctuation in imaging position of the whole lens system caused by environmental change.

The above-mentioned "environmental change" refers to changes in factors such as temperature change and moisture change which univocally change the refractive index of a plastic material.

In an example of more specific configuration, of the aspheric surfaces, the aspheric surface closest to the object in the first lens group is formed such that the negative refractive power becomes greater from the center of the lens toward the periphery thereof;

while the aspheric surface closest to the imaging surface in the second lens group is formed such that the positive refractive power becomes greater from the center of the lens toward the periphery thereof.

Further assuming that the maximum aspheric surface amount of the aspheric surface closest to the object in the first lens group is $\Delta ZG_1$, the maximum aspheric surface amount of the aspheric surface closest to the imaging surface in the second lens group is $\Delta ZG_2$, and the focal length on the longer focus side is $F_r$, the zoom lens of the present invention preferably satisfies the following conditional expressions (1) and (2);

while, assuming that, in the material forming the plastic lens, when the temperature is changed by $\Delta t$ degrees; the amount of change in refractive index is $\Delta N_p$ and the amount of change in paraxial back focus on the longer focus side is $\Delta Bft'$, satisfying the following conditional expression (3):

$$0.10 < |1,000 \times \Delta ZG_1/F_r| < 0.25 \quad (1)$$

$$0.8 < |1,000 \times \Delta ZG_2/F_r| \quad (2)$$

$$|\Delta Bft'/\Delta N_p| < 150.0 \quad (3)$$

wherein: $40 > |\Delta t|$

The above mentioned "aspheric surface amount" refers to the amount of displacement in the optical axis direction with reference to the spherical surface due to the paraxial curvature.

BRIEF DESCRIPTION OF THE DRAWINGS

FIG. 1 is a schematic view showing a basic lens configuration in accordance with an embodiment of the present invention;

FIG. 3 is an aberration chart of the lens in accordance with the embodiment at its telephoto end (at room temperature);

DETAILED DESCRIPTION OF THE PREFERRED EMBODIMENTS

Figures 2A, 2B, 2C:
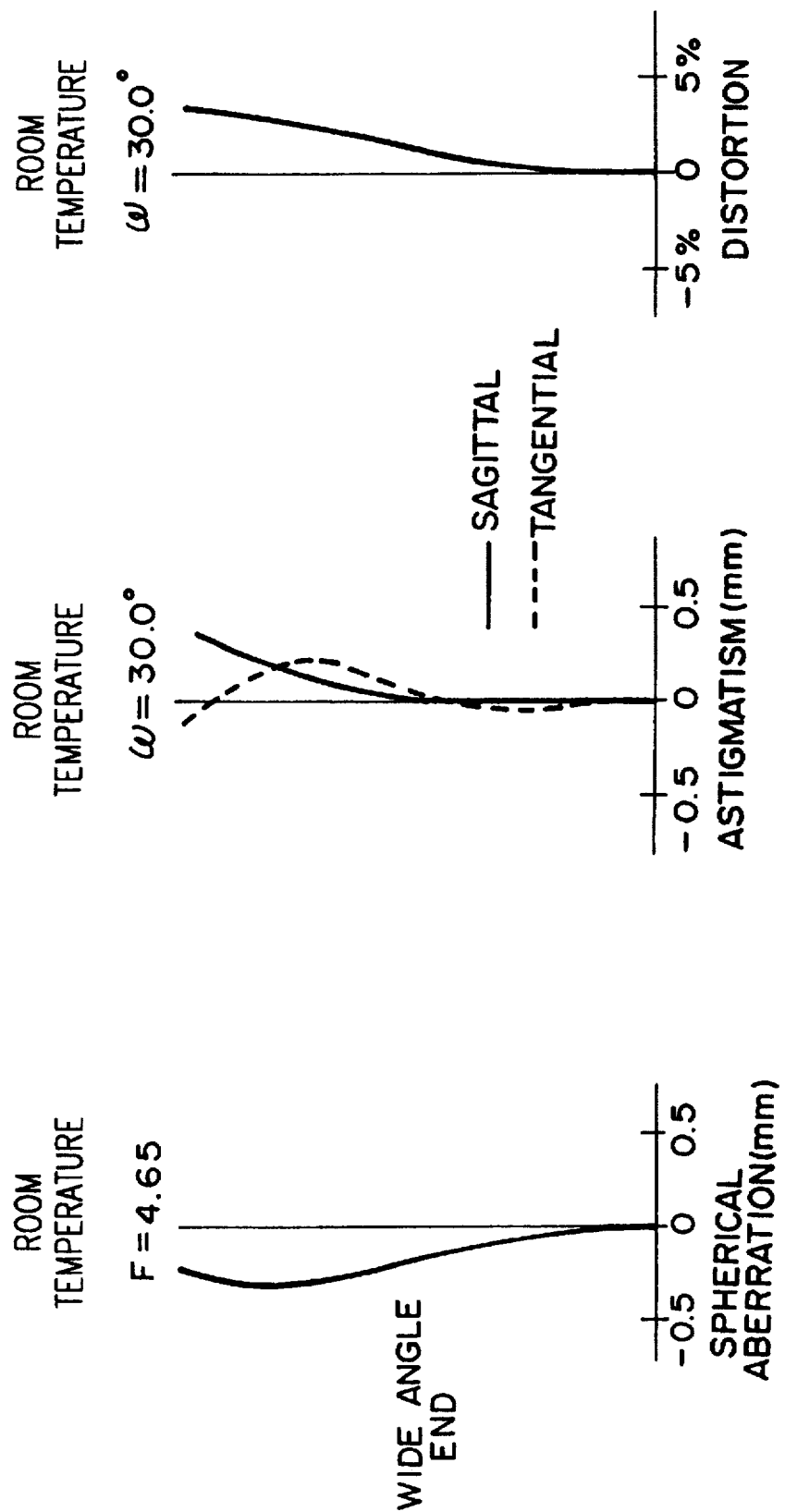
FIG. 2 is an aberration chart of the lens in accordance with the embodiment at its wide angle end (at room temperature)

In the following, an embodiment of the present invention will be explained with reference to drawings.

The compact two-group zoom lens in accordance with an embodiment shown in FIG. 1 comprises, successively from the object side, a first lens group $G_1$ having a positive refractive power as a whole and a second lens group $G_2$ having a negative refractive power; wherein, when zooming, the first lens group $G_1$ and the second lens group $G_2$ move along an optical axis X while changing the distance therebetween, thereby changing focal length f of the whole system and efficiently converging a luminous flux onto an imaging surface 1.

Also, in the zoom lens of this embodiment, of the aspheric surfaces, the aspheric surface closest to the object in the first lens group is formed such that the negative refractive power becomes greater from the center of the lens toward the periphery thereof;

while the aspheric surface closest to the imaging surface in the second lens group is formed such that the positive refractive power becomes greater from the center of the lens toward the periphery thereof.

Further, assuming that the maximum aspheric surface amount of the aspheric surface closest to the object in the first lens group is $\Delta ZG_1$, the maximum aspheric surface amount of the aspheric surface closest to the imaging surface in the second lens group is $\Delta ZG_2$, and the focal length on the longer focus side is $F_t$, the zoom lens of this embodiment satisfies the following conditional expressions (1) and (2);

while, assuming that, in the material forming the plastic lens, when the temperature is changed by $\Delta t$ degrees, the amount of change in refractive index is $\Delta N_p$ and the amount of change in paraxial back focus on the longer focus side is $\Delta Bft'$, satisfying the following conditional expression (3):

$$0.10 < |1,000 \times \Delta ZG_1/F_t| < 0.25 \quad (1)$$

$$0.8 < |1,000 \times \Delta ZG_2/F_t| \quad (2)$$

$$|\Delta Bft'/\Delta N_p| < 150.0 \quad (3)$$

wherein: $40 > |\Delta t|$

More specifically, the first lens group $G_1$ has a first lens $L_1$ made of a negative meniscus lens whose concave surface faces the object, a second lens $L_2$ made of a low-power plastic lens having aspheric surfaces on both sides, and a third lens $L_3$ made of a biconvex lens whose surface with a stronger curvature faces the imaging surface; whereas the second lens group $G_2$ is constituted by a fourth lens $L_4$ made of a positive meniscus plastic lens having aspheric surfaces on both sides and whose convex surface faces the imaging surface and a fifth lens $L_5$ made of a negative meniscus lens whose concave surface faces the object.

Namely, in the above-mentioned zoom lens, the second lens $L_2$ in the first lens group $G_1$ and the fourth lens $L_4$ in the second lens group $G_2$ are formed by plastic lenses, while each of both sides of these plastic lenses is made as an aspheric surface, whereby, even when the refractive index of the plastic material fluctuates due to temperature change and the like, the change in paraxial back focus amount caused by this fluctuation is canceled by the spherical aberration which is generated by this aspheric surface and yields an action in a direction opposite thereto, so as to suppress the fluctuation in imaging position.

Since, when the fluctuation in spherical aberration caused by temperature change and the like is made large in the aspheric surface in the first lens group, performances of the periphery of the lens may deteriorate, an aspheric surface which prevents the performances of the periphery of the lens from deteriorating is disposed in the second lens group.

In the following, technical significance of each of the above-mentioned expressions will be explained.

Namely, below the lower limit of expression (1), the amount of fluctuation in spherical aberration due to temperature change and the like may become too small and the capacity for correcting back focus may become too small. Beyond its upper limit, by contrast, sensitivity for eccentricity may increase such that the suitability for manufacture is deteriorated.

Below the lower limit of expression (2), the capacity for correcting the deterioration of peripheral image quality may become too small.

Below the lower limit of expression (3), the sensitivity of the paraxial back focus with respect to temperature change and the like may become too high, whereby the deterioration in performance due to temperature change and the like may become too much.

Next, radius of curvature R (mm) of each lens surface, center thickness of each lens and air gap between neighboring lenses (collectively referred to as "axial spacing" hereinafter) D (mm), refractive index N and Abbe number $\upsilon$ of each lens at d line in the zoom lens in accordance with the first embodiment are shown in the following Table 1.

Here, the numbers in the table successively increase from the object side.

Also, each of the surfaces designated by "*" at the left side of the surface No. is formed as an aspheric surface and refers to an aspherical form computed by the following expression (A):

$$Z = CY^2/\{1+(1-KC^2Y^2)^{1/2}\} + A_2Y^4 + A_3Y^6 + A_4Y^8 + A_5Y^{10} \quad (A)$$

wherein Z is the length (mm) of a perpendicular drawn from a point on the aspheric surface having a height Y from the optical axis to a tangential plane (plane perpendicular to the optical axis) of the apex of the aspheric surface; C is the paraxial curvature of the aspheric surface; Y is the height (mm) from the optical axis; K is the eccentricity; and $A_2$ to $A_5$ are aspherical coefficients of the fourth, sixth, eighth, and tenth orders, respectively.

Also, the following Table 2 shows values of the respective constants C, K, and $A_2$ to $A_5$ of the aspheric surface indicated by the above-mentioned expression (A).

Further, as shown in Table 1, focal length f', Fno, and field angle 2 ω of the whole lens system in this embodiment are 36.15 to 75.20 mm, 4.65 to 9.78, and 61.8° to 32.1°, respectively.

Figures 4A, 4B, 4C:
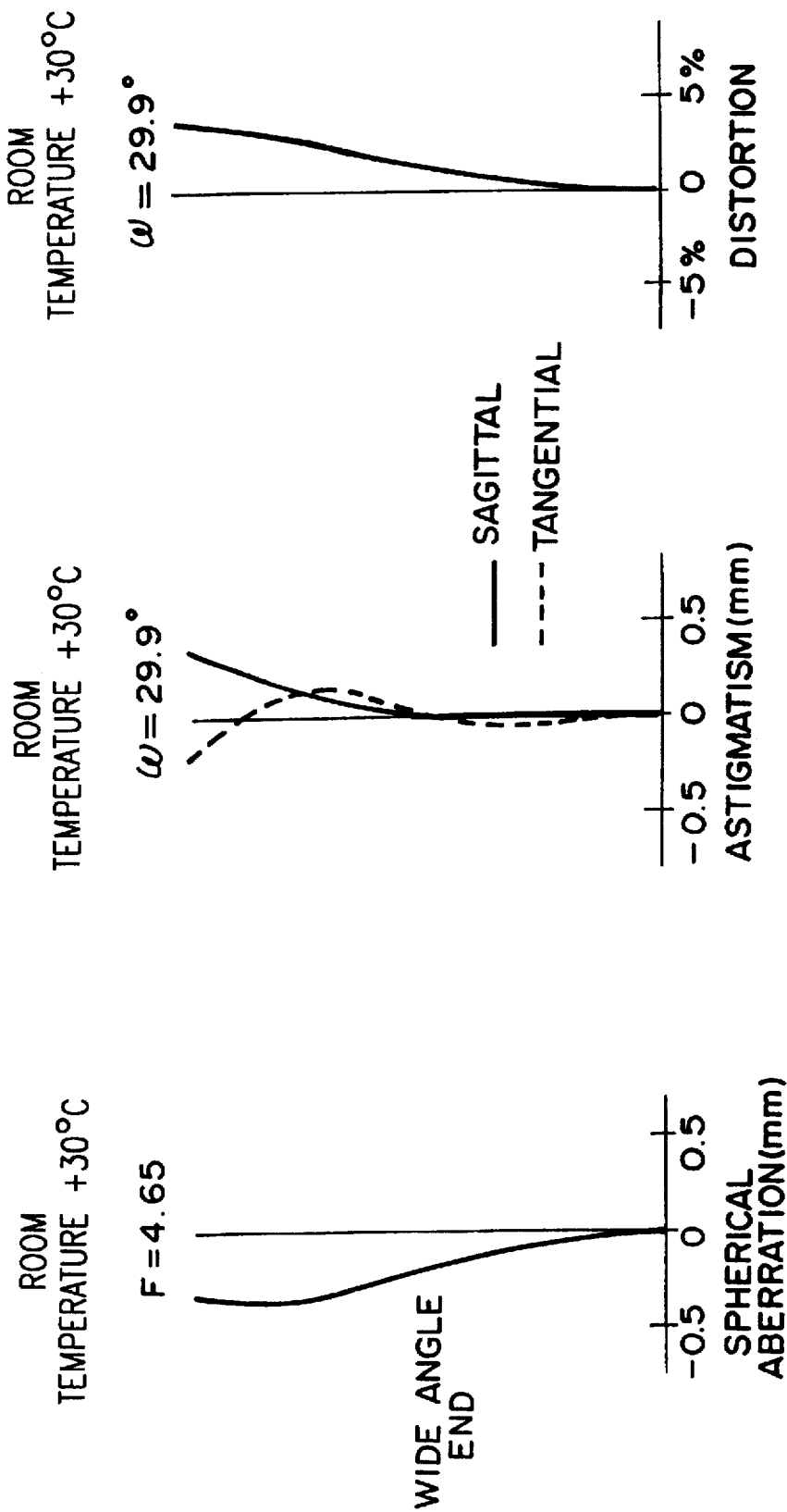
FIG. 4 is an aberration chart of the lens in accordance with the embodiment at its wide angle end (at room temperature +30° C.)
Figures 5A, 5B, 5C:
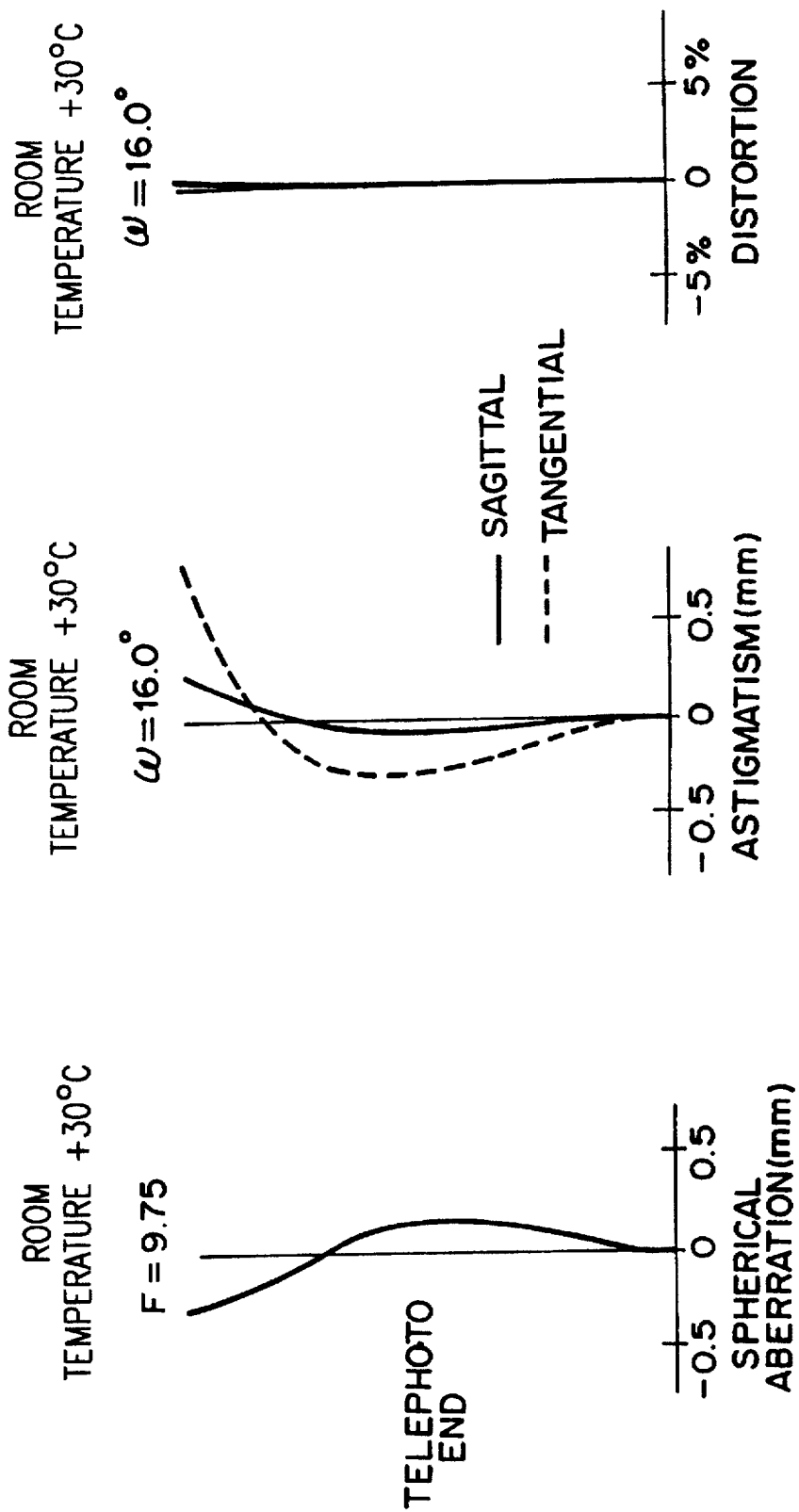
FIG. 5 is an aberration chart of the lens in accordance with the embodiment at its telephoto end (at room temperature +30° C.).

FIGS. 2 and 3 are aberration charts showing various kinds of aberration (spherical aberration, astigmatism, and distortion) of the zoom lens in this embodiment at its wide angle end and telephoto end, respectively, at room temperature; whereas FIGS. 4 and 5 are aberration charts showing various kinds of aberration (spherical aberration, astigmatism, and distortion) of the zoom lens in this embodiment at its wide angle end and telephoto end, respectively, at a temperature higher than room temperature by 30° C. For each astigmatism chart, the respective aberrations with respect to the sagittal (S) image surface and the tangential (T) image surface are shown. As can be seen from these charts, in accordance with the zoom lens of this embodiment, spherical aberration in the periphery of the lens greatly changes due to changes in temperature, in particular, at the telephoto end, thereby compensating for the fluctuation in the amount of paraxial back focus.

Specifically, when temperature changes by ±30° C., the paraxial back focus amount at the telephoto end fluctuates by about ±0.4 mm. On the other hand, when temperature changes by ±30° C., the above-mentioned spherical aberration makes the imaging position fluctuate by about ±0.4 mm in the direction opposite to the above-mentioned fluctuation in the back focus amount. Consequently, their amounts of fluctuation cancel each other, whereby the imaging position does not fluctuate due to temperature change and the like.

Without being restricted to the foregoing embodiment, the compact two-group zoom lens of the present invention can be configured in various manners. For example, the number and form of lenses constituting each lens group as well as the number of aspherical lenses and the form of the aspheric surface can be selected appropriately.

As explained in the foregoing, in the compact two-group zoom lens of the present invention, even when the refractive index of the plastic material forming the plastic lens fluctuates due to temperature change and the like, the change in the paraxial back focus amount caused by this fluctuation is canceled by spherical aberration which is generated by the aspheric surface and yields an action in a direction opposite thereto, so as to suppress the fluctuation in imaging position.

Accordingly, without deteriorating the degree of freedom in designing the lens, while satisfying the demand for a compact size, a low cost, and a high performance, the zoom lens of the present invention can suppress fluctuation in the refractive index of the plastic lens due to temperature change and the like.

TABLE 1

| Surface No. | R | D | N | ν |
|---|---|---|---|---|
| 1 | −21.906 | 0.98 | 1.76182 | 26.6 |
| 2 | −55.539 | 0.88 | | |
| *3 | −615.735 | 1.68 | 1.49023 | 57.5 |
| *4 | −615.735 | 1.85 | | |
| 5 | 52.720 | 4.62 | 1.48749 | 70.4 |
| 6 | −10.295 | Variable | (12.20−5.03) | |
| *7 | −103.152 | 4.34 | 1.49023 | 57.5 |
| *8 | −19.502 | 2.73 | | |
| 9 | −9.505 | 1.40 | 1.69680 | 55.6 |
| 10 | −218.997 | | | | f = 36.15−75.20,

F n o = 4.65−9.78,

2 ω = 61.8°−32.1°

TABLE 2

| | K | $A_2$ (4th order) | $A_3$ (6th order) | $A_4$ (8th order) | $A_5$ (10th order) |
|---|---|---|---|---|---|
| Surface No. 3 | −7.46565 | −2.63081*10$^{-4}$ | −8.10468*10$^{-7}$ | −3.85172*10$^{-8}$ | 4.02631*10$^{-11}$ |
| Surface No. 4 | 6.36044*10$^{-1}$ | −4.72865*10$^{-6}$ | 1.536381*10$^{-6}$ | 4.87790*10$^{-9}$ | −1.44754*10$^{-11}$ |
| Surface No. 7 | −1.89127*10$^{-1}$ | −5.10731*10$^{-6}$ | 3.508263*10$^{-6}$ | −6.04945*10$^{-8}$ | 3.89930*10$^{-10}$ |
| Surface No. 8 | −8.53548 | −2.53038*10$^{-4}$ | 3.143181*10$^{-6}$ | −3.65944*10$^{-8}$ | 1.34098*10$^{-11}$ |

What is claimed is:

1. A compact two-group zoom lens comprising, successively from an object side, a positive first lens group and a negative second lens group, in which distance between these two lens groups is changed so as to attain a variable power;

wherein at least one plastic lens having an aspheric surface is disposed in each of said two lens groups;

wherein said aspheric surfaces have a form for generating spherical aberration which compensates for fluctuation in imaging position of said zoom lens as a whole caused by environmental change;

wherein, of said aspheric surfaces, the aspheric surface closest to the object in said first lens group is formed on a lens of negative refractive power that said negative refractive power becomes greater from the center of the lens toward periphery thereof;

the aspheric surface closest to an imaging surface in said second lens group is formed on a lens of positive refractive power such that said positive refractive power becomes greater from the center of the lens toward the periphery thereof; and where, a maximum aspheric surface amount of the aspheric surface closest to the object in said first lens group is $\Delta ZG_1$, maximum aspheric surface amount of the aspheric surface closest to the imaging-surface in said second lens group is $\Delta ZG_2$, and a focal length on a longer focus side is $F_r$, the following conditional expressions (1) and (2) are satisfied and wherein in a material forming the plastic lenses when temperature is changed by $\Delta t$ degrees, the amount of change in refractive index caused by a change in temperature is $\Delta N_p$, and amount of change in paraxial back focus on the longer focus side is $\Delta Bft$, the following conditional expression (3) is satisfied:

$$0.10 < |1,000 \times \Delta ZG_1/F_r| < 0.25 \quad (1)$$

$$0.8 < |1,000 \times \Delta ZG_2/F_r| \quad (2)$$

$$|\Delta Bft/\Delta N_p| < 150.0 \quad 3)$$

wherein $40 > |\Delta t|$.

* * * * *